(12) United States Patent
Yoshida

(10) Patent No.: US 10,093,132 B2
(45) Date of Patent: Oct. 9, 2018

(54) PNEUMATIC TIRE

(71) Applicant: SUMITOMO RUBBER INDUSTRIES, LTD., Kobe-shi, Hyogo (JP)

(72) Inventor: Yukishi Yoshida, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 361 days.

(21) Appl. No.: 14/900,472

(22) PCT Filed: Jul. 7, 2014

(86) PCT No.: PCT/JP2014/068085
§ 371 (c)(1),
(2) Date: Dec. 21, 2015

(87) PCT Pub. No.: WO2015/005291
PCT Pub. Date: Jan. 15, 2015

(65) Prior Publication Data
US 2016/0152091 A1 Jun. 2, 2016

(30) Foreign Application Priority Data

Jul. 12, 2013 (JP) .................................. 2013/146878

(51) Int. Cl.
*B60C 11/11* (2006.01)
*B60C 11/03* (2006.01)
*B60C 11/12* (2006.01)

(52) U.S. Cl.
CPC ...... *B60C 11/0332* (2013.01); *B60C 11/0302* (2013.01); *B60C 11/0306* (2013.01);
(Continued)

(58) Field of Classification Search
CPC .................... B60C 11/0302; B60C 2011/0381
See application file for complete search history.

(56) References Cited

U.S. PATENT DOCUMENTS 6,571,844 B1 6/2003 Ochi et al.
2011/0041973 A1* 2/2011 Numata .............. B60C 11/0306
152/209.18
(Continued)

FOREIGN PATENT DOCUMENTS

EP 2130691 A1 12/2009
EP 2319712 A1 5/2011
(Continued)

OTHER PUBLICATIONS

English machine translation of JP2003-211920 (Year: 2003).*
(Continued)

*Primary Examiner* — Robert C Dye
(74) *Attorney, Agent, or Firm* — Birch, Stewart, Kolasch & Birch LLP

(57) ABSTRACT

A pneumatic tire (1) has a tread (2), the direction (R) of rotation of the tread (2) being specified. Crown main grooves (3) and shoulder main grooves (4) are provided in the tread (2) to thereby define middle lands (5B). Each of the middle lands (5B) is provided with middle lateral grooves (18) arranged in separating from each other so as to define middle blocks (20). Each of the middle blocks (20) is provided with: a middle narrow groove (21) which extends from a middle lateral groove (18) on the trailing landing side, in the direction (R) of rotation, toward the leading landing side and which terminates without reaching a middle lateral groove (18) on the leading landing side; an inner sipe (S2) disposed on the inside of the middle narrow groove (21) in the axial direction of the tire; and an outer sipe (S3) disposed on the outside in the axial direction of the tire. The width (W6a) of the middle narrow grooves (21) and the direction of tilt of the inner and outer sipes (s2, s3) are limited to predetermined ranges.

4 Claims, 5 Drawing Sheets

(52) U.S. Cl.
CPC ........... *B60C 11/11* (2013.01); *B60C 11/1236* (2013.01); *B60C 2011/0334* (2013.01); *B60C 2011/0341* (2013.01); *B60C 2011/0344* (2013.01); *B60C 2011/0346* (2013.01); *B60C 2011/0358* (2013.01); *B60C 2011/0369* (2013.01); *B60C 2011/0374* (2013.01); *B60C 2011/0376* (2013.01); *B60C 2011/0381* (2013.01); *B60C 2011/0383* (2013.01); *B60C 2011/1209* (2013.01)

(56) References Cited

U.S. PATENT DOCUMENTS

| | | | |
|---|---|---|---|
| 2012/0273108 A1 | 11/2012 | Yoshida | |
| 2014/0020803 A1* | 1/2014 | Fujita | B60C 11/03 152/209.18 |

FOREIGN PATENT DOCUMENTS

| | | | |
|---|---|---|---|
| EP | 2522531 A1 | | 11/2012 |
| JP | 2003-211920 A | | 7/2003 |
| JP | 2004-306906 | * | 11/2004 |
| JP | 4323623 B2 | | 9/2009 |
| JP | 2009-269500 A | | 11/2009 |
| JP | 2012-232644 A | | 11/2012 |
| JP | 2012-245858 A | | 12/2012 |
| WO | WO2012/133559 | * | 10/2001 |

OTHER PUBLICATIONS

English machine translation of JP2004-306906 (Year: 2004).*
Extended European Search Report, dated Feb. 8, 2017, for European Application No. 14822341.5.
International Search Report, issued in PCT/JP2014/068085, dated Oct. 7, 2014.
Written Opinion of the International Searching Authority, issued in PCT/JP2014/068085, dated Oct. 7, 2014.

* cited by examiner

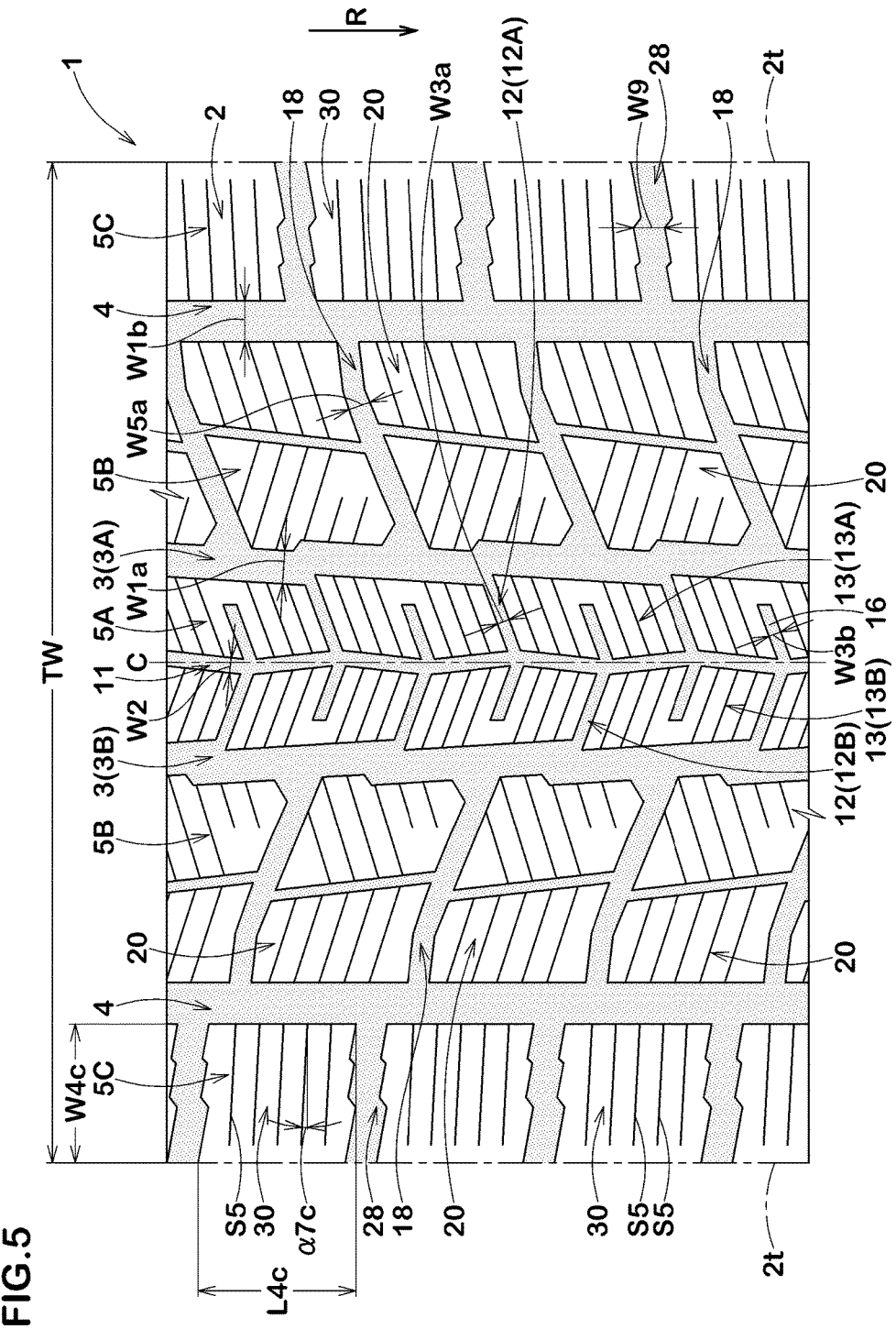

US 10,093,132 B2

PNEUMATIC TIRE

TECHNICAL FIELD

The present invention relates to a pneumatic tire capable achieving on-ice performance, on-snow performance, and steering stability on a dry road at high levels.

BACKGROUND OF THE INVENTION

Conventionally, it was proposed a pneumatic tire which includes a tread portion with a block provided with a plurality of sipes (See the following Patent Document 1, for example). Such a pneumatic tire may improve edge component of the block and increase friction force against an icy road surface in order to improve on-ice performance.
Patent Document 1: Japanese Unexamined Patent Application Publication No. 2009-269500.

DISCLOSURE OF THE INVENTION

Problems to be Solved by the Invention

Unfortunately, such a block had a small rigidity because of sipes. Therefore, there was a problem that the block was tends to deform excessively by receiving force from the road surface and may decline on-snow performance and steering stability on a dry road surface.

It is therefore, in view of the above-mentioned problems, an object of the present invention to provide a pneumatic tire capable of achieving on-ice performance, on-snow performance, and steering stability on a dry road surface at high levels.

Means for Solving the Problem

The present invention in a first embodiment provides a pneumatic tire comprising a tread portion having a specified rotational direction, the tread portion comprising a pair of middle land portions each of which is defined between a circumferentially and continuously extending crown main groove and a circumferentially and continuously extending shoulder main groove disposed axially outward of the crown main groove, wherein the crown main groove is one disposed on a tire equator or, alternatively, a pair disposed on both sides of the tire equator. Each of the middle land portions being formed into a plurality of middle blocks divided by a plurality of middle lateral grooves that communicate between the crown main groove and the shoulder main groove. Each of the middle blocks is provided with a middle narrow groove extending forward in the rotational direction from the middle lateral groove which is adjacent backward in the rotational direction of the middle block and terminating without reaching the middle lateral groove which is adjacent forward in the rotational direction of the middle block, an inner sipe disposed axially inward of the middle narrow groove and an outer sipe disposed axially outward of the middle narrow groove The middle narrow groove has a width in a range of from 1.7 to 4.0 mm. The inner sipe extends axially inwardly from the middle narrow groove while inclining backwardly in the rotational direction. The outer sipe extends axially outwardly from the middle narrow groove while inclining backwardly in the rotational direction. And each of the inner sipe and the outer sipe has an angle in a range of from 5 to 30 degrees with respect to a tire axial direction.

The invention in a second embodiment is a pneumatic tire wherein each of the middle blocks comprises a leading portion located forward in the rotational direction of a forward end of the middle narrow groove and extending continuously from the crown main groove to the shoulder main groove, an inner portion located among the middle narrow groove, the crown main groove and the leading portion and an outer portion located among the middle narrow groove, the shoulder main groove and the leading portion.

The invention in a third embodiment is a pneumatic tire wherein a groove centerline of the middle narrow groove is located axially outward of a centerline of a maximum width of the middle block.

The invention in a fourth embodiment is a pneumatic tire wherein the middle narrow groove is inclined axially inward toward the rotational direction at an angle ranging of from 5 to 10 degrees with respect to a circumferential direction of the tire.

The invention in a fifth embodiment is a pneumatic tire wherein the tread portion is provided on both sides of the tire equator with two crown main grooves so as to form a crown land portion, and an axially maximum width of the middle block is in a range of from 20% to 50% of a tread ground-contact width.

The "standard rim" is the rim determined for each tire by a standard including one on which the tire is based, and the standard rim is the standard rim in the case of JATMA, a "Design Rim" in the case of TRA, and a "Measuring Rim" in the case of ETRTO.

The "standard internal pressure" means the air pressure determined for each tire by the standard. The "standard internal pressure" is a maximum air pressure in JATMA, a maximum value described in a table "TIRE LOAD LIMITS AT VARIOUS COLD INFLATION PRESSURES" in the case of TRA, and "INFLATION PRESSURE" in the case of ETRTO. When the tire is for a passenger vehicle, the standard internal pressure is uniformly 180 KPa.

Effect of the Invention

The pneumatic tire of the present invention includes the tread portion having the specified rotational direction. The tread portion includes a pair of middle land portions each of which is defined between a circumferentially and continuously extending crown main groove and a circumferentially and continuously extending shoulder main groove disposed axially outward of the crown main groove, wherein the crown main groove is one disposed on a tire equator or, alternatively, a pair disposed on both sides of the tire equator.

Each of the middle land portions formed into a plurality of middle blocks divided by a plurality of middle lateral grooves that communicate between the crown main groove and the shoulder main groove. This middle block can increase a mount of digging into snowy road, and can smoothly guide water screen between the tread portion and the road surface. Thus, the middle block helps to improve the on-snow performance and drainage performance.

Each of the middle blocks being provided with a middle narrow groove extending forward in the rotational direction from the middle lateral groove which is adjacent backward in the rotational direction of the middle block and terminating without reaching the middle lateral groove which is adjacent forward in the rotational direction of the middle block, an inner sipe disposed axially inward of the middle narrow groove and an outer sipe disposed axially outward of the middle narrow groove. These middle narrow groove, inner sipe and outer sipe can increase the edge component of the middle block and improve turning performance on an icy road.

Also, since the middle narrow groove terminates without reaching the middle lateral groove which is adjacent forward in the rotational direction, it is possible to keep the rigidity of the middle block in the forward. Therefore, the middle narrow groove helps to improve the on-snow performance and the steering stability performance on a snowy road. Moreover, since a groove width of the middle narrow groove is limited to a range from 1.7 to 4.0 mm, the reduction of rigidity of the middle block can be effectively inhibited.

Furthermore, the inner sipe extends forward to backward in the rotational direction and inclines toward the tire-axially inner side from the middle narrow groove side. The outer sipe extends forward to backward in the rotational direction and inclines toward the tire-axially outer side from the middle narrow groove. An angle between the inner sipe and the outer sipe with respect to the tire axial direction is in a range of from 5 to 30 degrees.

These inner sipe and outer sipe can decrease the circumferential rigidity of the middle block and enlarge a ground contact area. Moreover, the inner sipe and the outer sipe can improve the edge component in the axial direction and the circumferential direction of the tire. Therefore, the inner sipe and the outer sipe help to improve the on-ice performance.

Also, the middle block is subjected to the external force of the road surface from forward to backward in the rotational direction at the time of time of braking, owing to the above-mentioned inclined inner sipe and outer sipe, therefore the block piece lying next to each other over the middle narrow groove is distorted in shape to the direction of narrowing down the groove width of the middle narrow groove, thereby supporting each other. Thus, the middle block can improve the block rigidity, and the on-snow performance and the on-snow performance can be maintained.

BRIEF DESCRIPTION OF THE DRAWINGS

FIG. 5 is a development view of a tread portion of a pneumatic tire of Comparative Example.

EXPLANATION OF THE REFERENCE

Figure 1:
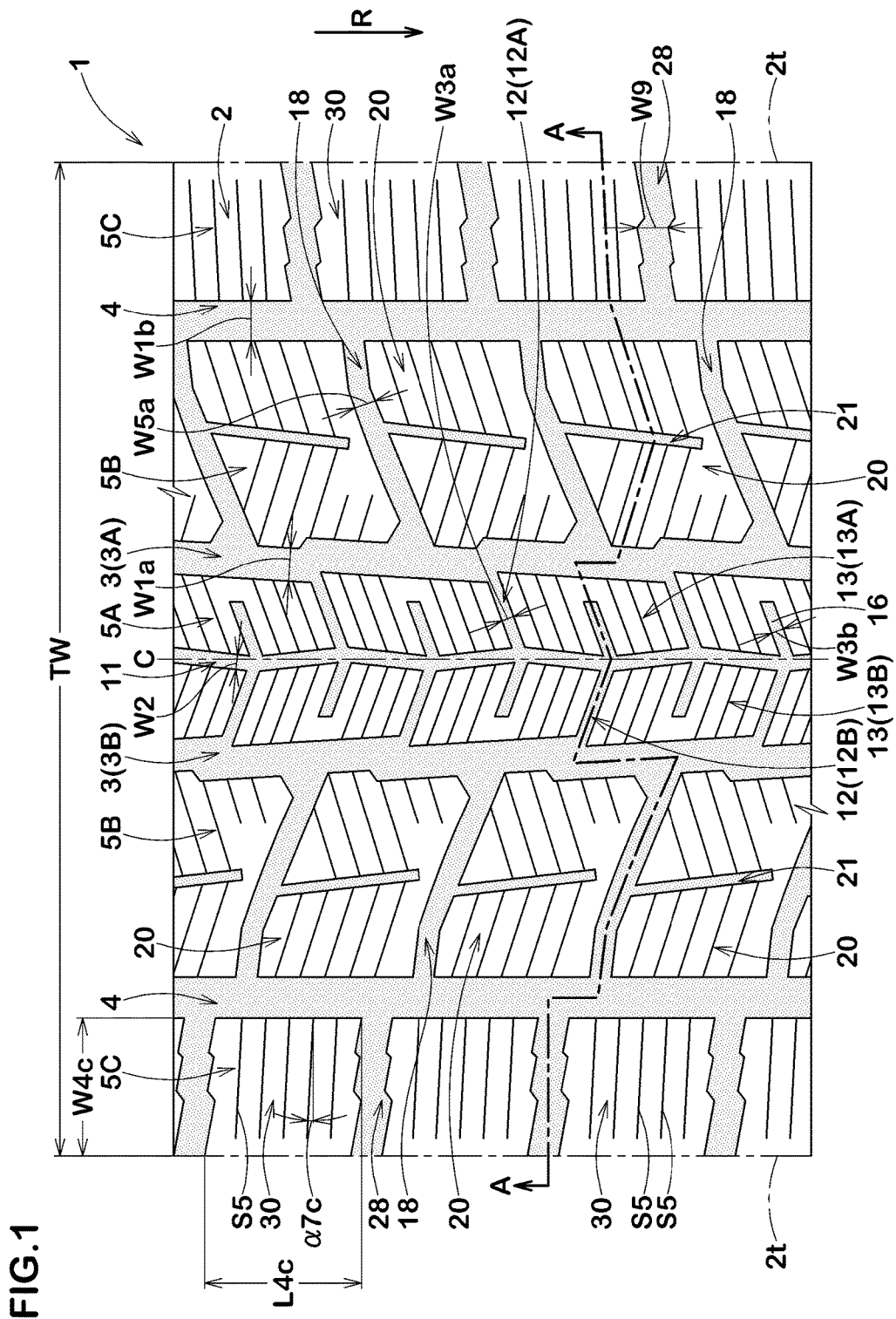
FIG. 1 is a development view of a tread portion of a pneumatic tire of the present invention.

1 Pneumatic tire
2 Tread portion
3 Crown main groove
4 Shoulder main groove
5B Middle land portion
20 Middle block
21 Middle narrow groove
S2 Inner sipe
S3 Outer sipe

BEST MODE FOR CARRYING OUT THE INVENTION

Hereinafter, an embodiments of the present invention will be described with referent to the drawings.

Figure 2:
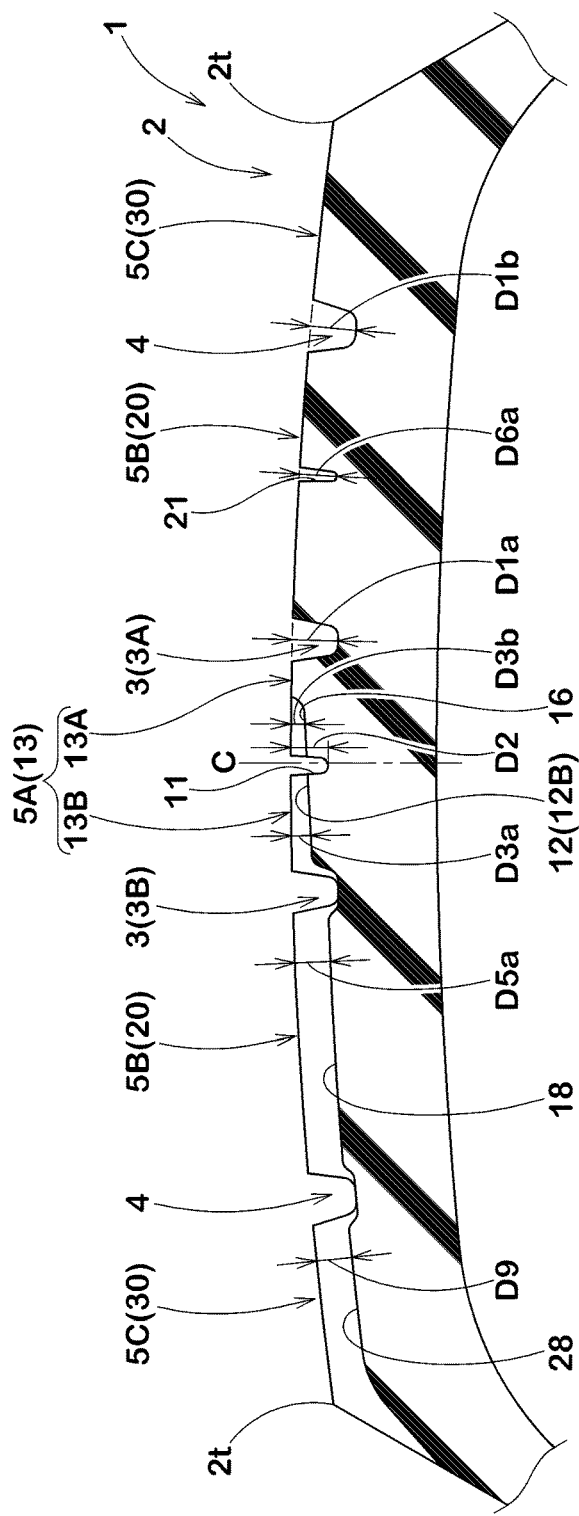
FIG. 2 is a view taken along line A-A of FIG. 1.

As shown in FIGS. 1 and 2, the pneumatic tire 1 (hereinafter may be simply called as a "tire") of the present embodiment is embodied as a studless tire for passenger vehicles including a tread portion 2 having a specified rotational direction R of the tire 1. Also the rotational direction R is shown using a pictorial sign on a sidewall portion and the like of the tire (not shown), for example.

The tread portion 2 of the present embodiment includes a pair of crown main grooves 3 continuously extending on both sides of the tire equator in the circumferential direction of the tire, and a pair of shoulder main grooves 4 continuously extending on both sides of each of the crown main grooves 3 in the circumferential direction of the tire.

Thus the tread portion 2 includes a crown land portion 5A between the pair of crown main grooves 3 and 3, a pair of middle land portions 5B each of which is between one of the crown main grooves 3 and one of the shoulder main grooves 4, and a pair of shoulder land portions 5C each of which is between one of the shoulder main grooves 4 and a tread edge 2t. The crown main grooves 3 of the present embodiment are disposed on both sides of the tire equator C. Alternatively, it may be provided a single crown main groove on the tire equator C.

In the present description, the "tread edge 2t" is determined as the edge when it can be discriminated on a distinct edge from the standpoint of appearance. If the edge is unidentifiable, it is determined as the tread edge that contact with the flat surface at the outmost side in the axial direction of the tire when the tread portion 2 of the tire 1 under the standard state with the standard load and is contacted to the ground at a camber angle of zero degree.

The "standard load" is a load determined for each tire by the standard, and is a maximum load ability in the case of JATMA, a maximum value described in a Table "TIRE LOAD LIMITS AT VARIOUS COLD INFLATION PRESSURES" in the case of TRA, and a "LOAD CAPACITY" in the case of ETRTO.

The crown main groove 3 comprises a first crown main groove 3A disposed on one side with respect to the tire equator C and a second crown main groove 3B disposed on the other side. As enlargedly shown in FIG. 3, each of the crown main groove 3A and the crown main groove 3B comprises a sloped portion 7 and a connecting portion 8. The sloped portion 7 inclines toward the tire-axially inner side with respect to the rotational direction R. The connecting portion 8 connects the circumferentially adjacent sloped portions 7 and 7 and inclines in a direction opposite to the sloped portion 7. These sloped portion 7 and connecting portion 8 are alternately provided in the tire circumferential direction and formed in a zig-zag manner.

The sloped portion 7 extends from an outer end 7o toward an inner end 7i in the axial direction of the tire with an inclination toward the ti re equator C side. The connecting portion 8 extends and connects between the inner end 7i of the sloped portion 7 and the outer end 7o of the sloped portion 7 adjacent to the sloped portion 7 in the rotational direction R. The outer end 7o and outer end 7i are determined on the groove centerlines 3Ac and 3Bc of the crown main groove 3.

Each of these crown main grooves 3A and 3B can drain in the circumferential direction of the tire by breaking up water screen between the tread portion 2 and the road surface, thereby enabling to improve the drainage performance. Moreover, the crown main grooves 3A and 3B can obtain a large shearing force against snow owing to the zig-zag form such as a saw blade formed by the sloped portion 7 and the connecting portion 8, thereby enabling to improve the on-snow performance. Moreover, each of the crown main grooves 3A and 3B has the larger edge component than that of straight groove so as to improve the on-ice performance.

Figure 3:
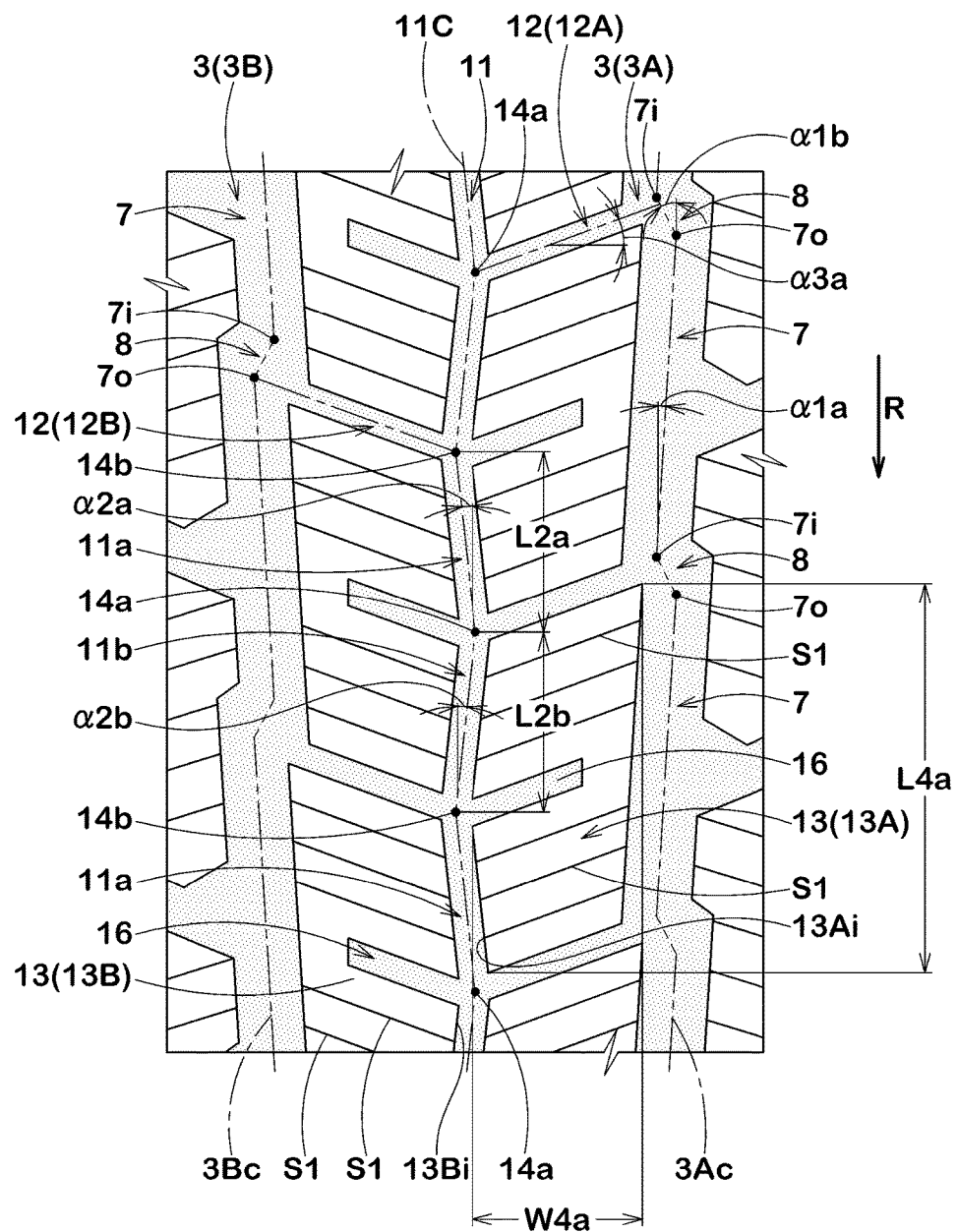
FIG. 3 is an enlarged view of a crown land portion.

To exert the above-mentioned function effectively, a groove width W1a (shown in FIG. 1) of each of the crown main grooves 3A and 3B is preferably in a range of from 2% to 6% of a tread ground contact width TW (shown in FIG. 1), which is an axial length of the tread edges 2t and 2t, and a groove depth D1a (shown in FIG. 2) is preferably in a range of from 5% to 10% of the tread ground contact width TW. Furthermore, as shown in FIG. 3, an angle α1a of the sloped portion 7 is preferable in a range of from 1 to 10 degrees with respect to the tire circumferential direction, and an angle α1b of the connecting portion 8 is preferably in a range of from 40 to 60 degrees with respect to the circumferential direction of the tire.

Each of the crown main grooves 3A and 3B of the present embodiment has a symmetrical shape with respect to the tire equator C, and the zig-zag phases are arranged shiftingly one another in the circumferential direction of the tire. In this way, in each of the crown main grooves 3A and 3B, the shearing force against snow and the edge component can be evenly improved in the circumferential direction of the tire, thereby improving the on-snow performance and the on-ice performance.

As shown in FIG. 1, the shoulder main groove 4 is formed as a straight groove extending in a linear fashion along the tire circumferential direction. Such a straight groove can smoothly drain the water screen between the tread portion 2 and the road surface in the circumferential direction of the tire at the times of straight-running and cornering, thereby enabling to improve the drainage performance. Also, a groove width W1b of the shoulder main groove 4 is preferably in a range of from 2% to 7% of the tread ground contact width TW, and the groove depth D1b (shown in FIG. 2) is preferably in a range of from 5% to 10% of the tread ground contact width TW.

The crown land portion 5A comprises a crown minor groove 11 continuously extending along the tire equator C, and a crown lateral groove 12 extending between the crown minor groove 11 and the crown main groove 3. Therefore, the crown land portion 5A comprises crown blocks 13 segmented by the crown minor groove 11, the crown main groove 3 and the crown lateral groove 12 in the circumferential direction of the tire and arranged in separating from each other.

As shown in FIG. 3, the crown minor groove 11 comprises a first sloped portion 11a and a second sloped portion 11b. The first sloped portion 11a inclines to the one side in the axial direction of the tire with respect to the rotational direction R. The second sloped portion 11b connects the circumferentially adjacent first sloped portions 11a and 11a and inclines to the other side in the axial direction of the tire. These sloped portions 11a and 11b are alternately arranged in the circumferential direction of the tire. In this way, the crown minor groove 11 comprises a first zig-zag apex 14a protruding toward one side and a second zig-zag apex 14b protruding toward the other side and forms in a zig-zag manner.

A groove width W2 (shown in FIG. 1) of the crown minor groove 11 is set to be smaller than each of the groove widths W1a and W1b of the main grooves 3 and 4. A groove depth D2 (shown in FIG. 2) of the crown minor groove 11 is set to be smaller than each of the groove depths D1a and D1b of the main grooves 3 and 4.

This crown minor groove 11 can inhibit reduction of rigidity of the crown land portion 5A while improving the on-snow performance, the steering stability performance on the dry road surface, and the drainage performance. Also the groove width W2 is preferably in a range of from about 0.5% to 1.5% of the tread ground contact width TW, and the groove depth D2 (shown in FIG. 2) is preferably in a range of about from 1% to 3% of the tread ground contact width TW.

As shown in FIG. 3, the first sloped portion 11a and the second sloped portion 11b of the present embodiment have the same angles α2a and α2b with respect to the tire circumferential direction of the tire and the same lengths L2a and L2b in the circumferential direction of the tire, respectively. Therefore, the crown minor groove 11 exerts the edge components of the respective first sloped portion 11a and second sloped portion 11b, thus the on-ice performance can be improved.

To exert such a function effectively, the angles α2a and α2b are preferably in a range of 1 to 10 degrees, and the lengths L2a and L2b are preferably in a range of from 5% to 11% of the tread ground contact width TW (shown in FIG. 1). Also, the angles α2a and α2b and the lengths L2a and L2b are preferably identified on a groove centerline 11C of the crown minor groove 11.

The crown lateral groove 12 comprises a first crown lateral groove 12A and a second crown lateral groove 12B. The first crown lateral groove 12A extends between a first zig-zag apex 14a of the crown minor groove 11 and an outer end 7o of the sloped portion 7 of the first crown main groove 3A. The second crown lateral groove 12B extends between the second zig-zag apex 14b and the outer end 7o of the sloped portion 7 of the second crown main groove 3B. These crown lateral groove 12A and 12B extend and incline at an angle α3a of from 10 to 30 degrees with respect to the axial direction of the tire and provided alternately in the circumferential direction of the tire.

This crown lateral groove 12 can inhibit the reduction of rigidity of the crown land portion 5A while guiding the water screen between the crown land portion 5A and the road surface thereby improving the drainage performance. And, the crown lateral groove 12 can improve the edge component and the shearing force against snow in a balanced manner, and can improve the on-ice performance and the on-snow performance. Also, a groove width W3a (shown in FIG. 1) of each of the crown lateral grooves 12A and 12B is preferably in a range of about from 0.5% to 1.5% of the tread ground contact width TW. A groove depth D3a (shown in FIG. 2) of each of the crown lateral grooves 12A and 12B is preferably in a range of about from 2% to 7% of the tread ground contact width TW.

The crown block 13 includes a first crown block 13A disposed on one side with respect to the crown minor groove 11 and a second crown block 13B disposed on the other side with respect to the crown minor groove 11. These crown blocks 13A and 13B are alternatively disposed in the circumferential direction of the tire.

Each of the crown blocks 13A and 13B has a rectangular shape, which is substantially vertically long in planar view, having a tire-circumferentially maximum length L4a larger than an tire-axially maximum width W4a. Moreover, each of the axially inner edges 13Ai and 13Bi of the crown blocks 13A and 13B protrudes toward the respective zig-zag apexes 14a and 14b of the crown minor groove 11.

Such crown blocks 13A and 13B can effectively improve the circumferential rigidity and also can improve the traction performance on the snowy road and the dry road surface.

Moreover, each of the crown blocks 13A and 13B can make the circumferential grounding length relatively large, and the inner edges 13Ai and 13Bi protruding inward in the axial direction of the tire can increase the edge component and improve the on-ice performance. Also, the length L4a of each of the crown blocks 13A and 13B is preferably in a range of about from 15% to 21% of the tread ground contact width TW (shown in FIG. 1). Furthermore, the maximum width W4a of each of the crown blocks 13A and 13B is preferably in a range of about from 5% to 12% of the tread ground contact width TW.

Moreover, each of the crown blocks 13A and 13B comprises a slot 16 extending from the crown minor groove 11 to each of the crown main grooves 3A and 3B side, and a Sipe S1 extending between the crown minor groove 11 and each of the crown main grooves 3A and 3B.

The slot 16 extends from the zig-zag apexes 14a and 14b of the crown minor groove 11 to each of the crown main grooves 3A and 3B sides and terminates without reaching each of the crown main grooves 3A and 3B. And the slot 16 is inclined in the same direction as the crown lateral groove 12 which is adjacent one another in the circumferential direction of the tire.

This slot 16 can discharge the water screen between the crown blocks 13A and 13B in the axial direction of the tire thereby improving the drainage performance. Moreover, the slot 16 can improve the edge component of the crown blocks 13A and 13B thereby improving the on-ice performance. Also, a groove width W3b (shown in FIG. 1) of the slot 16 is preferably in a range of about from 0.5% to 1.5% of the tread ground contact width TW (shown in FIG. 1). And a groove depth D3b (shown in FIG. 2) of the slot 16 is preferably in a range of about from 2% to 9% of the tread ground contact width TW.

The sipe S1 extends from forward to backward in the rotational direction R and inclines between the crown minor groove 11 and the crown main grooves 3A and 3B. The sipe S1 inclines in the same direction as the crown lateral groove 12 and the slot 16 which are adjacent in the circumferential direction of the tire.

This sipe S1 can reduce the circumferential rigidity of the crown blocks 13A and 13B and enlarge the ground contact area. Moreover, the sipe S1 can improve the edge component of the crown blocks 13A and 13B. Therefore, the sipe S1 can improve the on-ice performance.

As shown in FIG. 1, the middle land portion 5B is provided with middle lateral grooves 18 connecting the crown main groove 3 and the shoulder main groove 4 arranged in separating from each other in the circumferential direction of the tire. In this way, in the middle land portion 5B, a middle block 20 is segmented between the middle lateral grooves 18 and 18.

The middle lateral groove 18 extends from the crown main groove 3 toward the shoulder main groove 4 and inclines toward the backward in the rotational direction R. This middle lateral groove 18 can discharge the water screen between the middle land portion 5B and the road surface and can improve the drainage performance. Moreover, the middle lateral groove 18 can ram down snow in its groove so as to get the shearing force against snow thereby improving the on-snow performance. Also, a groove width W5a of the middle lateral groove 18 is preferably in a range of about from 1% to 4% of the tread ground contact width TW. A groove depth D5a (as shown in FIG. 2) is preferably in a range of about from 4% to 9% of the tread ground contact width TW.

Figure 4:
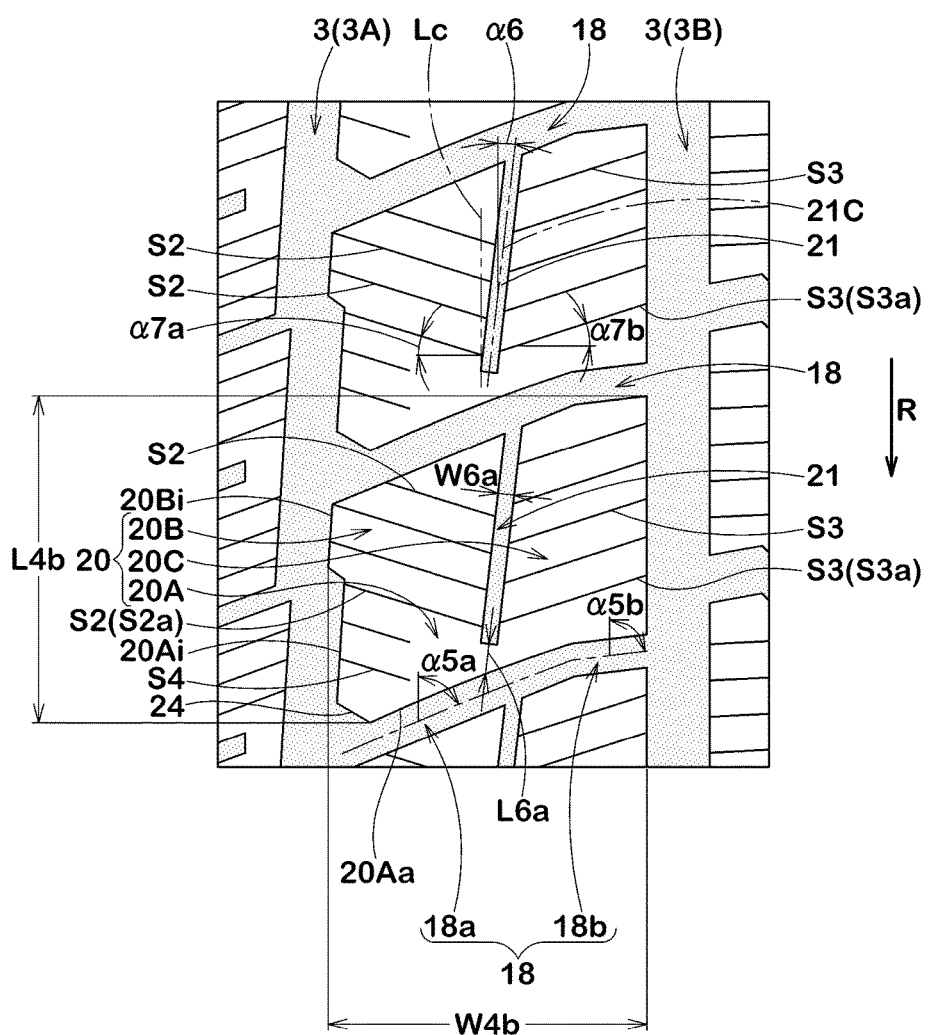
FIG. 4 is an enlarged view a middle land portion.

As enlargedly shown in FIG. 4, the middle lateral groove 18 comprises a steeply sloped portion 18a and a mildly sloped portion 18b. The steeply sloped portion 18a extends from the crown main groove 3 and inclines at an angle of α5a of from 15 to 35 degrees with respect to the circumferential direction of the tire. The mildly sloped portion 18b extends from the steeply sloped portion 18a and inclines at an angle α5b of from 1 to 10 degrees with respect to the axial direction of the tire.

In This middle lateral groove 18, the steeply sloped portion 18a can efficiently import the water in the crown main groove 3 thereby improving the drainage performance greatly. Furthermore, the middle lateral groove 18 can improve the shearing force against snow and the edge component more greatly by the inflections of the steeply sloped portion 18a and the mildly sloped portion 18b; therefore the on-snow performance and the on-ice performance can be improved.

In the middle block 20, the axially maximum width W4b and the circumferentially maximum length L4b are set to be substantially the same. Moreover, the middle block 20 extends forward to backward in the rotational direction R with inclination from inward to outward in the axial direction of the tire. Therefore, the middle block 20 is formed as a substantially horizontally-long parallelogram.

This middle block 20 can effectively improve the rigidity in the axial direction of the tire and in the circumferential direction of the tire and can improve the turning performance on the snowy road and the dry road surface. Moreover, the middle block 20 has the maximum width W4b larger as compared with of the crown block 13 and the after-mentioned shoulder block 30. Since the maximum width W4b is set to the maximum, the axial ground contact length can be relatively larger, and the turning performance on the icy road can be improved. To effectively exert such a function, the maximum width W4b of the middle block 20 is preferably set to in a range of from 20% to 25% of the tread ground contact width TW (as shown in FIG. 1).

Meanwhile, when the maximum width W4b is less than 20% of the tread ground contact width TW, it is possible that the above-mentioned function cannot sufficiently exert. When the maximum width W4b exceeds 25% of the tread ground contact width TW, since the axial width of the crown land portion 5A and the shoulder land portion 5c become small, it is possible that the on-ice performance, the on-snow performance and the steering stability performance on the dry road surface cannot be improved sufficiently. From the view point of this, the maximum width W4b is preferably not less than 21% and not more than 24% of the tread ground contact width TW.

Similarly, the maximum length W4b of the middle block 20 is preferably in a range of about from 21% to 26% of the tread ground contact width TW (as shown in FIG. 1).

Moreover, the middle block 20 is provided with a middle narrow groove 21, an inner sipe S2 and an outer sipe S3. The middle narrow groove 21 extends from backward to forward of the middle lateral groove 18 in the rotational direction R. The inner sipe S2 is disposed more axially inward than the middle narrow groove 21. The outer sipe S3 is disposed more axially outward than the middle narrow groove 21.

In this way, the middle block 20 is segmented into a leading portion 20A, an inner portion 20B, and an outer portion 20C. The leading portion 20A extends on an edge-side of the forward in the rotational direction R of the middle narrow groove 21 continuously from the crown main groove 3 to the shoulder main groove 4. The inner portion 20B is sandwiched between the middle narrow groove 21 and the crown main groove 3 on the backward in the rotational direction of the leading portion 20A. The outer portion 20C is sandwiched between the middle narrow groove 21 and the shoulder main groove 4 on the backward in the rotational direction R of the leading portion 20A.

The middle narrow groove 21 extends from the middle lateral groove 18 of the backward in the rotational direction R to the forward, and terminates without reaching the middle lateral groove 18 on the forward. This middle narrow groove 21 can keep the rigidity on the forward of the middle block 20 and increase the edge component. Therefore, the middle narrow groove 21 can improve the on-ice performance, on-snow performance and the steering stability performance on the dry road surface. To effectively exert such functions, the shortest distance L6a between the middle narrow groove 21 and the middle lateral groove 18 is preferably in a range of from 1% to 3% of the tread ground contact width TW.

Moreover, a groove width W6a of the middle narrow groove 21 of the present embodiment is set in a range of from 1.7 to 4.0 mm. Thus the middle narrow groove 21 can keep the rigidity of the middle block 20 and can discharge the water screen between the middle block 20 and the road surface in the circumferential direction of the tire. Therefore, the middle narrow groove 21 helps to improve the on-snow performance, the steering stability performance on the dry road surface, and the drainage performance.

Also, when the groove width W6a exceeds 4.0 mm, the rigidity of the middle block 20 cannot be possibly kept sufficiently. However, when the groove width W6a is less than 1.7 mm, the on-snow performance and the drainage performance are possibly kept insufficiently. From the view point of this, the groove width W6a is preferably not more than 3.0 mm, and more preferably not less than 2.0 mm.

From the similar view point, the groove depth D6a (as shown in FIG. 2) of the middle narrow groove 21 is preferably not less than 5.0 mm, more preferably not less than 7.0 mm, and preferably not more than 10.0 mm, more preferably not more than 9.0 mm.

The middle narrow groove 21 preferably extends from backward to forward in the rotational direction and inclines toward the tire-axially inner side. In this way, the middle narrow groove 21 can effectively exert the edge component in the circumferential direction of the tire and the edge component in the axial direction of the tire, thereby improving the on-ice performance. To effectively exert such a function, an angle α6 of the middle narrow groove 21 with respect to the circumferential direction of the tire is preferably in the range of 5 to 10 degrees.

Also, when the angle α6 is less than 5 degrees, the on-ice performance is possibly improved insufficiently. However, when the angle α6 exceeds 10 degrees, the middle narrow groove 21 is arranged over a wide range of the middle block 20 in the axial direction of the tire; thereby possibly not keeping the rigidity of the middle block 20 sufficiently. From the view point of this, the angle α6 is preferably not less than 6 degrees, more preferably not more than 9 degrees.

The groove centerline 21C of the middle narrow groove 21 is preferably disposed axially outside of the centerline Lc of the maximum width W4b of the middle block 20. Thus, the rigidity of the inner portion 20B, where the ground contact pressure is relatively large at the time of straight-running, can be relatively large and the traction performance on the snowy road and the dry road surface can be improved.

Each of the inner sipes S2 extends from forward to backward in the rotational direction R and from the middle narrow groove 21 to the ti re-axially inner side. Furthermore, the inner sipes S2 inclined at an angle α7a of from 5 to 30 degrees with respect to the axial direction of the tire, and are arranged in separating from each other in the circumferential direction of the tire. Moreover, the inner sipes S2 of the present embodiment except the first inner sipe S2a are disposed in the inner portion 20B. Also, the first inner sipe S2a is disposed on the most forward in the inner sipes S2 and segments into the leading portion 20A and the inner portion 20B.

On the other hand, each of the outer sipes S3 extends from forward to backward of the rotational direction R and from the middle narrow groove 21 to the tire-axially outer side. Furthermore, the outer sipes S3 incline at an angle α7b of from 5 to 30 degrees with respect to the axial direction of the tire and are arranged in separating from each other in the circumferential direction of the tire. Moreover, the outer sipes S3 of the present embodiment except the first outer sipe S3a are disposed in the outer portion 20C. Also, the first outer sipe S3a is disposed on the most forward side also in the outer sipes S3 and segments into the leading portion 20A and the outer portion 20C.

Owing to such inner sipe S2 and outer sipe S3, the middle block 20 has a small circumferential rigidity and a large ground contact area. Moreover, the inner sipe S2 and the outer sipe S3 can improve the edge components in the axial direction of the tire and the circumferential direction of the tire. Therefore, the inner sipe S2 and the outer sipe S3 helps in improvement of the on-ice performance.

The inner sipe S2 and the outer sipe S3 are arranged in each of the inner portion 20B and the outer portion 20C, which are adjacent to one another across the middle narrow groove 21, in a substantially V-shaped manner, where the forward in the rotational direction R is convexed. Therefore, the inner sipe S2 and the outer sipe S3 can deform the inner portion 20B and the outer portion 20C in the direction of narrow down the groove width of the middle narrow groove 21 at the time of time of braking influenced by an external force by the road surface from forward to backward in the rotational direction R. This helps that the middle block 20 supports the inner portion 20B and the outer portion 20C by contacting with one another, thereby preventing the fall of the middle block 20. Thus, the middle block 20 can improve the braking performance on the icy road and the snowy road.

Also, when an angle α7a and an angle α7b of the inner sipe S2 and the outer sipe S3 are not more than 5 degrees, the inner portion 20B and the outer portion 20C are possibly deformed on the middle narrow groove 21 side insufficiently. By contraries, when the angle α7a and the angle α7b exceed 30 degrees, the edge component in the axial direction of the tire excessively declines, and it is possible to exert the on-ice performance insufficiently. From the view point of this, the angle α7a and the angle α7b are preferably not less than 15 degrees, more preferably not than 25 degrees.

Moreover, the angle α7a of the inner sipe S2 and the angle α7b of the outer sipe S3 are desirably the same. Thus, the inner portion 20B and the outer portion 20C can uniformly deform thereby inhibiting generation of uneven wear in the inner portion 20B and the outer portion 20C.

The leading portion 20A is segmented by the first inner sipe S2a, the first outer sipe S3a, the crown main groove 3, the shoulder main groove 4, the middle lateral groove 18, and the middle narrow groove 21. Thus, the leading portion 20A continuously extends on the edge-side of the forward in the rotational direction R of the middle narrow groove 21 from the crown main groove 3 to the shoulder main groove 4. And a circumferential length of the leading portion 22A gradually increases from the middle narrow groove 21 side to the tire-axially inner side.

The leading portion 20A can improve the rigidity of the forward in the rotational direction R of the middle block 20 and can improve the traction performance on the snowy road and the dry road surface. And, the leading portion 22A can improve the rigidity toward the axially inner side and improve the traction performance at the time of straight-running.

Furthermore, the leading portion 20A of the present embodiment comprises a chamfered portion 24 formed by cutting out a corner portion between forward edge 20Aa in the rotational direction R and the inner edge 20A in the axial direction. This chamfered portion 24 can enlarge the edge component of the middle block 20 and can prevent damages such as a crack of the block and can improve the on-ice performance and the durability performance. Moreover, the chamfered portion 24 can guide the water in the crown main groove 3 to the middle lateral groove 18 effectively and can improve the drainage performance.

Furthermore, the leading portion 20A is preferably provided with a sipe S4. The sipe S4 of the present embodiment extends from the crown main groove 3 inward in the axial direction of the tire and terminates without reaching the middle narrow groove 21 and the middle lateral groove 18. This sipe S4 can inhibit the decrease of rigidity of the leading portion 20A while improving the edge component thereby improving the on-ice performance. To exert such a function effectively, the sipe S4 preferably extends parallel to the inner sipe S2.

The inner portion 20B is segmented by the crown main groove 3, the middle narrow groove 21, the middle lateral groove 18, and the first inner sipe S2a. Therefore, the inner portion 20B is formed in a substantially trapezoidal shape extending from the middle narrow groove 21 toward the crown main groove 3 in a tapered manner.

And in the inner portion 20B, its axial inner edge 20Bi protrudes more inward than an axial inner edge 20Ai of the leading portion 20A. This inner portion 20B helps to improve the edge component of the middle block 20.

The outer portion 20C is segmented by the shoulder main groove 4, the middle narrow groove 21, the middle lateral groove 18, and the first outer sipe S3a. Thus, the outer portion 20C is formed in a vertically-long rectangle shape extending from forward to backward in the rotational direction R. This outer portion 20C can increase the rigidity in the circumferential direction of the tire and can enlarge the ground contact length, thereby improve the on-ice performance, the on-snow performance, the steering stability performance on the dry road surface.

As shown in FIG. 1, in the shoulder land portion 5C, shoulder lateral grooves 28 each connecting the shoulder main groove 4 and the tread edge 2t are arranged in separating from each other in the circumferential direction of the tire. Thus, the shoulder land portion 5C is segmented into shoulder blocks 30 sandwiched between the shoulder lateral grooves 28 and 28.

The shoulder lateral groove 28 extends from the shoulder main groove 4 to the tread edge 2t side in a zig-zag manner. This shoulder lateral groove 28 can discharge the water screen between the shoulder land portion 5C and the road surface in the axial direction of the tire and can obtain a large shearing force against snow. Therefore, the shoulder lateral groove 28 can improve the drainage performance and the on-snow performance. Furthermore, the shoulder lateral groove 28 can increase the edge component of the shoulder block 30 owing to its zig-zag shape. Therefore, the shoulder lateral groove 28 can improve the on-ice performance. Also, to exert such a function effectively, a groove width W9 of the shoulder lateral groove 28 is preferably in a range of about from 2% to 4% of the tread ground contact width TW. Moreover, a groove depth D9 (as shown in FIG. 2) of the shoulder lateral groove 28 is preferably in a range of from 5% to 9% of the tread ground contact width TW.

In the shoulder block 30, the axially maximum width W4c and the circumferentially maximum length L4c are substantially the same, thereby forming a substantially rectangular shape. This shoulder block 30 can improve the rigidity in the circumferential direction of the tire and the axial direction of the tire in a balanced manner, thereby improving the traction performance and the turning performance on the snowy road and the icy road. Also, the maximum width W4c of the shoulder block 30 is preferably in a range of about from 10% to 18% of the tread ground contact width TW. And the maximum length L4c of the shoulder block 30 is preferably in a range of about from 10% to 20% of the tread ground contact width TW.

The shoulder block 30 is provided with a sipe S5 extending outward in the axial direction of the tire from the shoulder lateral groove 28 and terminating without reaching the tread edge 2t. This sipe S5 can inhibit the reduction of rigidity of the shoulder block 30 while increasing the edge component. Therefore, the sipe S5 can improve the on-ice performance, the on-snow performance, the steering stability performance on the dry road surface. Also, an angle $\alpha 7c$ of the sipe S4 with respect to the axial direction of the tire is preferably in a range of from 1 to 10 degrees.

Although especially preferred embodiment of the present invention has been described in detail, the invention is not limited to the illustrated embodiment, and various modifications can be made.

Embodiments

A test tire comprising a middle block, a middle narrow groove and a sipe having a basic structure shown in FIG. 1 and specifications shown in Table 1 was made, and respective performances were evaluated. And for comparison, a tire having a middle narrow groove shown in FIG. 5 and connecting with a middle lateral groove being adjacent in the circumferential direction of the tire was also evaluated. Common specifications were as follows:

Tire size: 225/65 R17
Rim size: 17×6.5J
Tread ground contact width TW: 180 mm
Crown main groove:
  Groove width W1a: 5.8 mm, W1a/TW: 3.2%
  Angle $\alpha 1a$ of sloped portion: 5 degrees
  Angle $\alpha 1b$ of connecting portion: 50 degrees
Shoulder main groove:
  Groove width W1b: 7.2 mm, W1b/TW: 4.0%
Middle lateral groove:
  Groove width W5a: 3.9 mm, W5a/TW: 2.2%
  Groove depth D5a: 11.0 mm, D5a/TW: 6.1%
  Angle $\alpha 5a$ of steeply sloped portion: 25 degrees
  Angle $\alpha 5b$ of mildly sloped portion: 5 degrees
Middle block:
  Maximum length L4b: 40.5 mm, L4b/TW: 22.5%
Middle narrow groove:
  Groove depth D6a: 9.0 mm
  Shortest distance L6a: 2.7 mm, L6a/TW: 1.5%
Test method was as follows.

<On-Ice Performance>

The test tires were mounted on the above-mentioned rims, inflated at inner pressure of 210 kPa and attached to the all wheels of a domestically-produced four-wheel-drive vehicle (engine displacement: 3500 cc). The vehicle ran on an icy road test course in a condition of "Mirror Road" under a circumstance of a temperature of 5 degrees C. below zero, and evaluated by a sensory of a professional driver in handle responsive performance, rigidity performance, grip and the like. They were rated on a scale of one to ten. The larger the numeric value is, the more favorable it is.

<On-Snow Performance>

The test tires were mounted on the above-mentioned rims under the same condition, and attached to the all wheels of the above-mentioned vehicle. The vehicle ran on a snowy road tire test course, and evaluated by the sensory of the professional driver in handle responsive performance, rigidity performance, grip and the like. They were rated on a scale of one to ten. The larger the numeric value is, the more favorable it is.

<Steering Stability Performance on Dry Road Surface>

The test tires were mounted on the above-mentioned rims under the same condition, and attached to the all wheels of the above-mentioned vehicle. The vehicle ran on a test course of a dry asphalt road surface, and evaluated by the sensory of the professional driver in properties relating rotational stability, transient property at a time of change of lanes, initial responsive performance and the like. They were rated on a scale of one to ten. The larger the numeric value is, the more favorable it is.

<Drainage Performance>

The test tires were mounted on the above-mentioned rims under the same condition, and attached to the all wheels of the above-mentioned vehicle. The vehicle ran on a test course of an asphalt road surface of 100 m in radius having a pool measuring 10 mm in depth and 20 m in length. The vehicle entered into the test course while having a graded increase of a speed ranging from 50 to 80 km/h, and a maximal lateral acceleration (lateral G) and a velocity at the time of the maximal lateral acceleration were measured. Evaluation was displayed using indices with the Comparative Example 1 being 100. The larger the numeric value is, the more favorable it is.

The test results are shown in Table 1.

TABLE 1

| | Com. Ex. 1 | Com. Ex. 2 | Ex. 1 | Ex. 2 | Ex. 3 | Com. Ex. 3 | Com. Ex. 4 | Ex. 4 | Ex. 5 | Com. Ex. 5 | Ex. 6 | Ex. 7 |
|---|---|---|---|---|---|---|---|---|---|---|---|---|
| Development view showing tread portion | FIG. 5 | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Groove width W6a of middle narrow groove [mm] | — | 1.5 | 1.7 | 2.0 | 3.0 | 8.0 | 2.0 | 2.0 | 2.0 | 2.0 | 2.0 | 2.0 |
| Angle α6 of middle narrow groove [degrees] | — | 8 | 8 | 8 | 8 | 8 | 8 | 8 | 8 | 8 | 8 | 0 |
| Position of groove centerline of middle narrow groove with respect to the centerline of middle block | — | outer side | outer side | outer side | outer side | outer side | outer side | outer side | outer side | outer side | inner side | outer side |
| Angle α7a of inner sipe [degrees] | 18 | 18 | 18 | 18 | 18 | 18 | 0 | 5 | 30 | 35 | 18 | 18 |
| Angle α7b of outer sipe [degrees] | 18 | 18 | 18 | 18 | 18 | 18 | 0 | 5 | 30 | 35 | 18 | 18 |
| Maximum width W4b of middle block [mm] | 37.8 | 37.8 | 37.8 | 37.8 | 37.8 | 37.8 | 37.8 | 37.8 | 37.8 | 37.8 | 37.8 | 37.8 |
| W4b/TW [%] | 21 | 21 | 21 | 21 | 21 | 21 | 21 | 21 | 21 | 21 | 21 | 21 |
| Present or absent of chamfered portion of leading portion | — | present | present | present | present | present | present | present | present | present | present | present |
| Present or absent of sipe of leading portion | — | present | present | present | present | present | present | present | present | present | present | present |
| On-ice performance (mark) [Larger is better.] | 8 | 10 | 10 | 10 | 10 | 7 | 8 | 8 | 8 | 6 | 8 | 8 |
| On-snow performance (mark) [Larger is better.] | 7 | 6 | 7 | 9 | 8 | 8 | 7 | 8 | 9 | 8 | 8 | 7 |
| Steering stability performance on dry road surface (mark) [Larger is better.] | 7 | 9 | 9 | 9 | 9 | 6 | 6 | 7 | 9 | 7 | 8 | 8 |
| Drainage performance (index) [Larger is better.] | 100 | 90 | 95 | 100 | 95 | 95 | 95 | 95 | 95 | 95 | 95 | 95 |

| | Ex. 8 | Ex. 9 | Ex. 10 | Ex. 11 | Ex. 12 | Ex. 13 | Ex. 14 |
|---|---|---|---|---|---|---|---|
| Development view showing tread portion | FIG. 1 | FIG. 1 | FIG. 1 | FIG. 1 | FIG. 1 | FIG. 1 | FIG. 1 |
| Groove width W6a of middle narrow groove [mm] | 2.0 | 2.0 | 2.0 | 2.0 | 2.0 | 2.0 | 2.0 |
| Angle α6 of middle narrow groove [degrees] | 5 | 10 | 15 | 8 | 8 | 8 | 8 |
| Position of groove centerline of middle narrow groove with respect to the centerline of middle block | outer side | outer side | outer side | outer side | outer side | outer side | outer side |
| Angle α7a of inner sipe [degrees] | 18 | 18 | 18 | 18 | 18 | 18 | 18 |
| Angle α7b of outer sipe [degrees] | 18 | 18 | 18 | 18 | 18 | 18 | 18 |
| Maximum width W4b of middle block [mm] | 37.8 | 37.8 | 37.8 | 36 | 45 | 37.8 | 37.8 |
| W4b/TW [%] | 21 | 21 | 21 | 20 | 25 | 21 | 21 |
| Present or absent of chamfered portion of leading portion | present | present | present | present | present | absent | present |
| Present or absent of sipe of leading portion | present | present | present | present | present | present | absent |
| On-ice performance (mark) [Larger is better.] | 8 | 10 | 9 | 9 | 9 | 9 | 8 |
| On-snow performance (mark) [Larger is better.] | 8 | 8 | 6 | 8 | 8 | 8 | 8 |
| Steering stability performance on dry road surface (mark) [Larger is better.] | 9 | 9 | 7 | 8 | 8 | 8 | 9 |
| Drainage performance (index) [Larger is better.] | 95 | 95 | 97 | 95 | 90 | 97 | 97 |

In consequence of the tests, it was confirmed, on-ice performance; on-snow performance and steering stability performance on the dry road surface were simultaneously achieved at high levels in the tire of the present embodiment.

The invention claimed is:

1. A pneumatic tire comprising:

a tread portion having a specified rotational direction, the tread portion comprising a pair of middle land portions each of which is defined between a circumferentially and continuously extending crown main groove and a circumferentially and continuously extending shoulder main groove disposed axially outward of the crown main groove, wherein the crown main groove is one disposed on a tire equator or, alternatively, a pair disposed on both sides of the tire equator;

each of the middle land portions being formed into a plurality of middle blocks divided by a plurality of middle lateral grooves that communicate between the crown main groove and the shoulder main groove; each of the middle blocks being provided with a middle narrow groove extending forward in the rotational direction from the middle lateral groove which is adjacent backward in the rotational direction of the middle block and terminating without reaching the middle lateral groove which is adjacent forward in the rotational direction of the middle block, an inner sipe disposed axially inward of the middle narrow groove and an outer sipe disposed axially outward of the middle narrow groove;

the middle narrow groove having a width in a range of from 1.7 to 4.0 mm, and being inclined axially inward toward the rotational direction at an angle ranging of from 5 to 10 degrees with respect to a circumferential direction of the tire;

the inner sipe extending axially inwardly from the middle narrow groove while inclining backwardly in the rotational direction;

the outer sipe extending axially outwardly from the middle narrow groove while inclining backwardly in the rotational direction; and each of the inner sipe and the outer sipe having an angle in a range of from 5 to 30 degrees with respect to a tire axial direction.

2. The pneumatic tire according to claim 1, wherein each of the middle blocks comprises a leading portion located forward in the rotational direction of a forward end of the middle narrow groove and extending continuously from the crown main groove to the shoulder main groove, an inner portion located among the middle narrow groove, the crown main groove and the leading portion and an outer portion located among the middle narrow groove, the shoulder main groove and the leading portion.

3. The pneumatic tire according to claim 1, wherein a groove centerline of the middle narrow groove is located axially outward of a centerline of a maximum width of the middle block.

4. The pneumatic tire according to claim 1, wherein the tread portion is provided on both sides of the tire equator with two crown main grooves so as to form a crown land portion, and an axially maximum width of the middle block is in a range of from 2% to 50% of a tread ground-contact width.

* * * * *